May 19, 1942. N. E. GEE 2,283,855
CAR SPRING SNUBBER
Filed Sept. 3, 1940 2 Sheets-Sheet 2
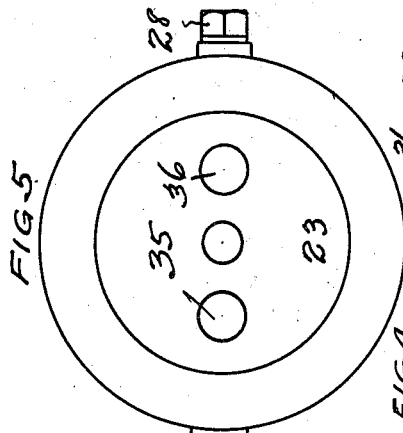
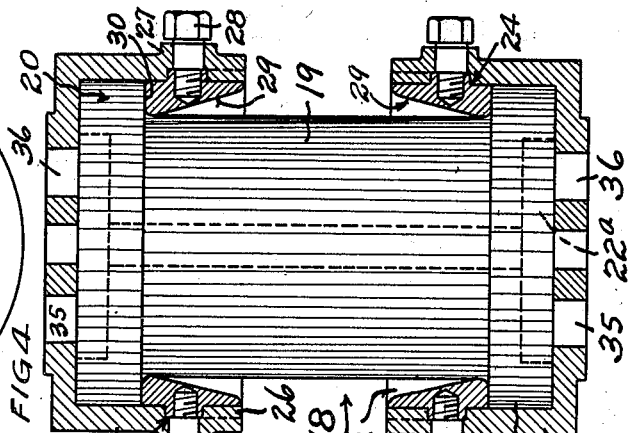
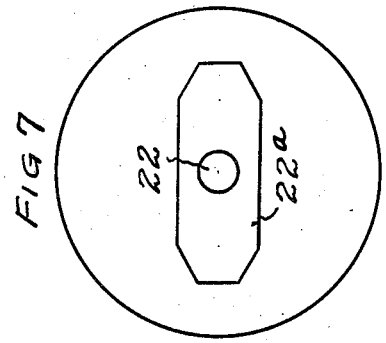
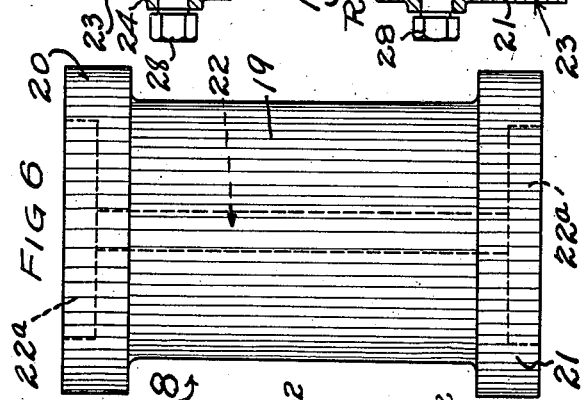
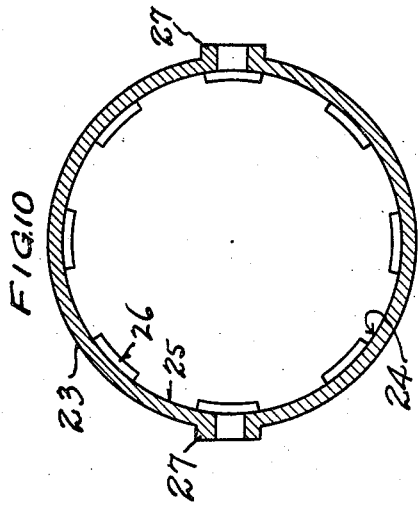
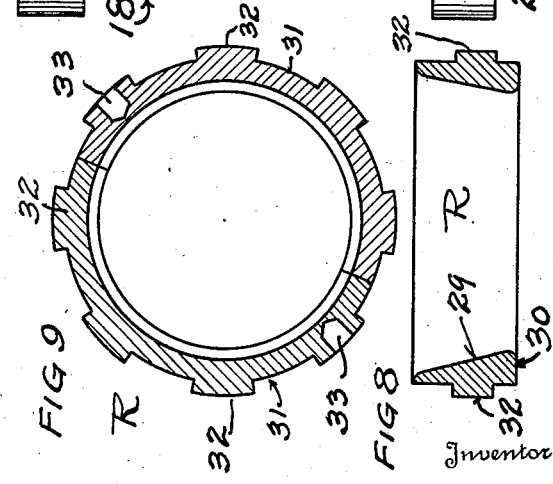
Inventor
N. E. Gee Patented May 19, 1942

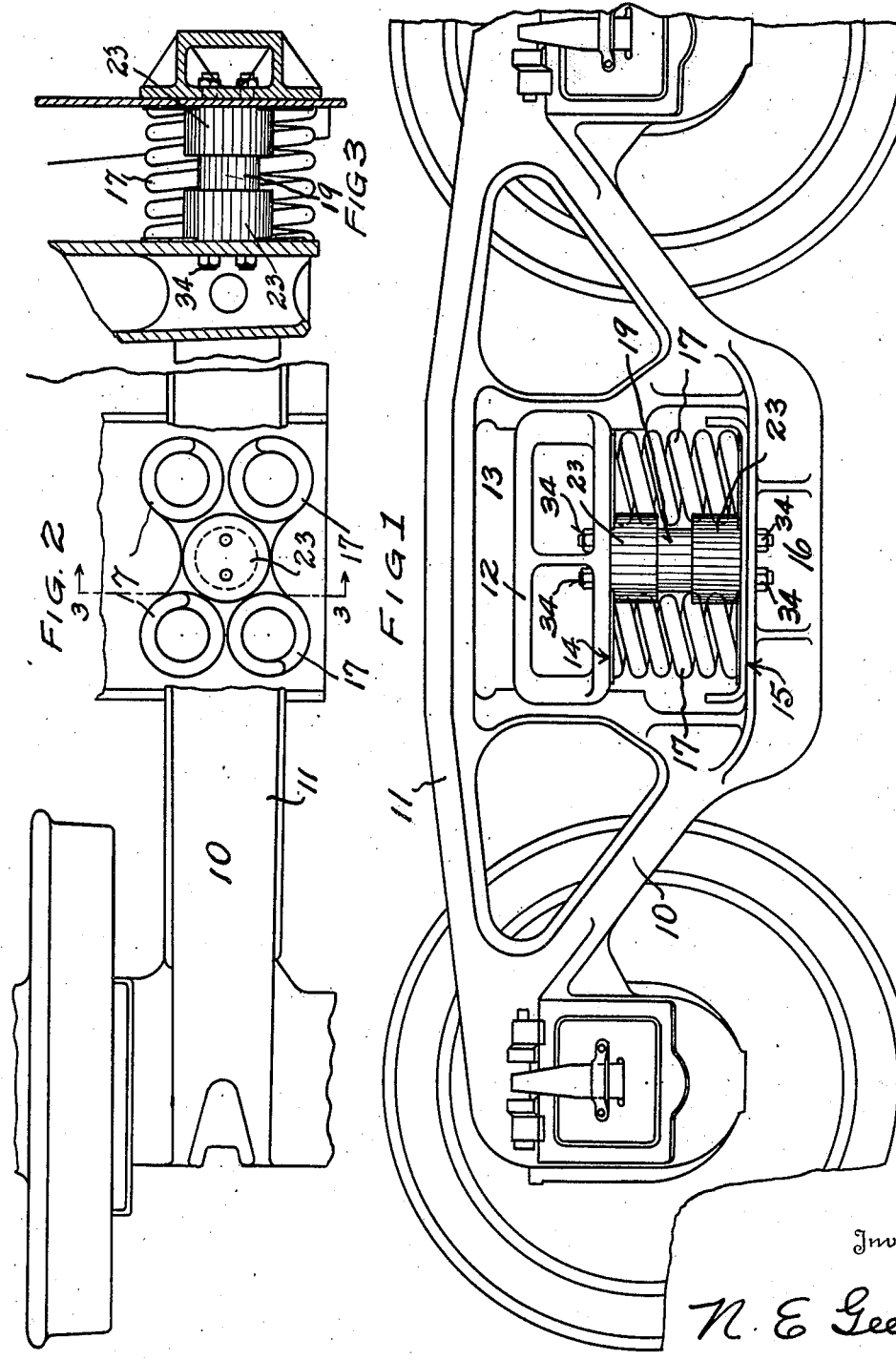

2,283,855

UNITED STATES PATENT OFFICE 2,283,855

CAR SPRING SNUBBER

Norman E. Gee, Narberth, Pa.

Application September 3, 1940, Serial No. 355,227

4 Claims. (Cl. 267—3)

This invention relates to railway car trucks and has for its primary object an improved type of truck spring snubber that embodies a high capacity for carrying loads under compression, combined with a high absorption rate in tension and release.

Another object of the invention is to provide means for fully utilizing the time period of absorption in a resilient truck spring snubber unit when compressed then suddenly released.

A further object is to provide an improved spring snubber unit that dampens out vertical movements, protects the car lading and decreases the maintenance cost of both the car and the road bed.

A still further object is to provide means for causing laden cars to ride even, level and smooth while operating over rail joints and uneven track as well as to be applicable to existing railway trucks without change in truck design.

With these and other objects in view which will become more readily apparent as the nature of the invention is better understood, the same consists in the novel construction, combination and arrangement of parts hereinafter more fully pointed out, illustrated and claimed.

It will be readily understood by those skilled in the art to which this invention belongs that the same is quite susceptible to a variety of structural changes and modifications without departing from the spirit or scope of the invention, but a preferred and practical embodiment of the invention is shown in the accompanying drawings, in which:

Figure 1 is a side elevation of a freight car truck, having the usual truck bolster positioned in the truck frame window and the present invention shown in operative relation with helical springs which yieldingly transfer the load carried by the bolster, to the bottom member of the truck frame.

Figure 2 is a plan view of the truck frame shown in Figure 1 of the drawings, with a portion of the truck frame and bolster removed to show the relative position of the new spring snubber unit.

Figure 3 is a vertical sectional view taken on the line 3—3 of Figure 2 looking in the direction of the arrow.

Figure 4 is an enlarged view of the present invention, with snubber housings shown in cross section in order to clearly show how each detail coacts with adjacent details in order to form a complete spring snubber unit assembly.

Figure 5 is a plan view of the parts shown in Figure 4 of the drawings.

Figure 6 is a side elevation of the resilient compression and tension unit of the spring snubber assembly, removed from the housings.

Figure 7 is a plan view of the parts shown in Figure 6 of the drawings.

Figure 8 is a cross sectional view of the snubber unit locking ring, which when locked in position as shown in Figure 4 resists any effort to elongate the resilient unit.

Figure 9 is a cross sectional view of the interior locking ring of Figure 8 showing the locking ledges or tongues which engage with spaced abutments of the housing.

Figure 10 is a cross sectional view of the inner end of the housings and shows the locking ledges or abutments which serve to hold the locking ring when pushed in place and rotated to locked position.

Similar reference numerals refer to similar parts throughout the several figures of the drawings.

In carrying out the invention no change in design has been made in the conventional freight car truck designated in its entirety by the numeral 10.

The usual freight car truck consists essentially of a frame 11, a bolster 12, positioned in a window 13, of the frame 11. Between the upper face 15 of the bottom member 16 of the truck frame and the lower face 14 of the bolster 12, suitable helical load carrying springs 17 are positioned, as indicated in Figure 1 of the drawings. When a coil or helical spring is compressed, it stores up energy, and when released it gives back practically all the energy that was required to compress it, hence the compression characteristics of a coil spring are represented by a straight line, and the release characteristics are represented by the same straight line, and since no energy is absorbed the release period is short, this being an inherent characteristic of all helical springs.

A single helical spring will vibrate when a load is dropped upon it, and will continue to vibrate or bounce up and down until the vibrations gradually dampen or die out. A group of helical springs will likewise vibrate in proportion to the load placed upon them, and if under a truck bolster in a loaded freight car truck, vibrations of small amplitude are set up due to track irregularities and the speed is such that at each rail joint another blow is delivered in the same direction and at a time corresponding to the natural vibration, the spring group will vibrate until the coils of the helical springs impinge upon each other and the springs go solid.

When the helical springs go solid under a loaded truck, damage to the lading results, as well as damage to the road bed. Since the present tendency is to operate freight cars at higher speeds the vibrations or oscillations become more violent and the truck bolster is often lifted off the springs. The present invention prevents these conditions.

Railway coil springs are each designed to carry a certain load under a certain deflection and when additional loads are to be carried, additional helical springs are added to each spring group, hence if one of the coil springs are removed it follows that something must be substituted that will carry practically the same load under the same deflection or impose upon the remaining helical springs, additional loads which will result in greater deflections, and to this end the present invention is designed to carry practically the same load and under the same deflection as the helical spring it replaces in the truck.

As will be observed from the drawings, the spring snubber unit which is intended to replace one of the helical springs in the truck is designated generally as 18. This unit consists of a resilient rubber body 19 provided at opposite ends thereof with outwardly projecting flanges 20 and 21. As indicated by dotted lines, the said body 19 may be provided with a longitudinal bore 22 and may also be provided with the recesses 22ᵃ in its end walls. For the purpose of mounting and anchoring the snubber unit 18 in position, suitable mounting means are provided. Said mounting means preferably consist of upper and lower housings or socket members which are of duplicate construction, and, therefore, a description of one will suffice for the other.

Referring to Figures 4, 5, 8, 9 and 10, it will be observed that the mounting means, in each instance, includes a cup-like housing 23 whose internal diameter is substantially the same as the external diameter of the flanges 20 and 21. The inner wall of each housing, near the open end thereof, is provided with an annular recess 24 which communicates with alternate vertical recesses 25 and locking abutments 26, the inner faces of said locking abutments 26 lying in substantially the same plane as the inner wall of the housing body which receives a flange of the rubber body 19. As will be apparent from Figures 4 and 10, the housings 23 are provided with hollow bosses 27 for receiving fastenings or locking elements 28 whose purpose will presently appear.

The alternate recesses 25 and abutments 26 are intended to cooperate with corresponding portions of suitable locking rings R (Figures 8 and 9) which are preferably made in two sections as shown in Figure 9. These locking rings preferably include a body portion whose inner face is tapered as indicated at 29 to flare outwardly from a locking shoulder 30 which is intended to engage one side of a flange of the rubber body 19 for the purpose of holding and locking it in the housing. The outer faces of the sections constituting the rings R are provided with alternate recesses 31 and abutments 32 which are intended to cooperate with the vertical recesses 25 and the abutments 26 of the housings 23. That is to say, the housings 23 are first assembled over the flanged ends 20 and 21 of the rubber body 19 and then the sectional locking rings R may be placed in position by placing the ring sections about the cylindrical portion of the body and causing the abutments 32 thereof to enter the recesses 25. After each sectional ring is thus positioned so that its shoulder 30 engages behind its related offset flange, the entire ring is shifted circumferentially so that the abutments 32 of the ring sections engage behind the abutments 26 of the housings. The rings are circumferentially shifted until the sockets 33 aline with the openings in the studs 27 whereupon the fastening elements 28 may be inserted to lock both sections of the ring rigidly in position as shown in Figure 4.

It will, of course, be understood that the completely assembled unit of Figure 4 may be placed between the top face 15 of the bottom member 16 of the truck frame and the bottom face 14 of the bolster 12, and secured thereto in an appropriate manner. As an example of how this may be accomplished, it may be pointed out that suitable fastenings 34 may be employed. That is to say, suitable bolts may be positioned in the openings 35 and 36 in the bottom wall of each housing 23 with the heads of the bolts resting on the recesses 22ᵃ formed in the ends of the rubber body 19. The upper ends of these bolts which project through the face 15 of the bottom member of the truck frame and the face 14 of the bolster 12 may be provided with suitable nuts, as shown in Figure 1 to securely anchor the housings respectively to the truck frame and bolster. It will thus be apparent that when the unit assembled according to Figure 4 is placed in position, the rubber body 19 is securely held in the housing to receive and resist both compressive and tensile stresses. When the bolster frame rises relative to the truck frame, it will be apparent that since the flanges 20 and 21 are held by the shoulders 30 of the locking rings R, the body 19 will be stretched. On the other hand, when the bolster and truck frame move toward each other, the load thus imposed will be cushioned by the entire cross sectional area of the rubber body 19. Thus, the rubber snubber unit serves in a very practical way to dampen vibrations that may be set up due to inequalities or unevenness in the road bed. This dampening effect is obtained in both of the following described ways. First, when the cylindrical part of the spring snubber unit is distended due to the weight carried, and the weight is suddenly released, the rubber snubber will not follow the helical spring characteristics due to the time lag of the rubber in assuming its original shape and the work of absorption during the release period. And, second, as soon as release of the helical springs occurs, the tension feature, which is always present with this new design, immediately functions and the vertical oscillations are dampened out while the car and its lading ride smooth.

In the design of new truck frames and bolster castings, the housings 23 could be formed as an integral part of the truck castings which design would eliminate the use of any bolts, nuts or fastenings thus further simplifying the design.

I claim:

1. In a car truck, the combination with the truck frame, bolster, and springs positioned between the bolster and the frame, of a combined rubber compression and tension snubber device also positioned between the bolster and the frame, said device including a cylindrical rubber body having outwardly offset flanges at opposite ends thereof, a pair of housings for receiving the flanged ends of said rubber body unit, and means embracing said rubber body and disposed within the housings for locking said flanges therein.

2. In a car truck, the combination with the truck frame, bolster, and springs positioned between the bolster and the frame, of a combined rubber compression and tension snubber device also positioned between the bolster and the frame, said device including a cylindrical rubber body, annular flanges offset from each end of said body, a pair of cup-like housing members for receiving the flanged ends of said body, said housings being each provided at their inner faces with alternate recesses and abutments, a pair of sectional locking rings also provided on their outer faces with alternate recesses and abutments and adapted to be inserted in the housings by causing the abutments to first register with the recesses of the housings, said abutments of the rings when the latter are shifted circumferentially being shifted behind the abutments at the inner faces of the housings, and means for locking said rings in the housings against circumferential shifting.

3. In a car truck, the combination with the truck frame, bolster, and springs positioned between the bolster and the frame, of a combined rubber compression and tension snubber device also positioned between the bolster and the frame, said device including a cylindrical rubber body having recesses in the opposite ends thereof, annular flanges also formed at opposite ends of said rubber body, cup-like housings for receiving said flanges of the body, said housings including bottom walls and side walls, the said bottom walls being provided with fastening receiving openings which communicate with the recesses in the ends of the rubber body, and the said side walls of the housings being provided at their inner faces with alternate recesses and abutments, apertured bosses also formed on the side walls of the housings, locking rings insertable in the housings, said locking rings each including an inclined inner face and a shoulder for engaging with the inner faces of the flanges of the rubber body unit, a plurality of alternate abutments and recesses formed on the outer faces of sadi rings, certain of said abutments being provided with sockets, the abutments of said rings being adapted to register with the recesses at the inner faces of the housings and then to be shifted circumferentially behind the abutments of the housings until the sockets of certain of said abutments on the rings register with the apertured bosses of the housings, and fastenings adapted to be inserted in said registering sockets and apertured bosses.

4. In a car truck, the combination with the truck frame, bolster, and springs positioned between the bolster and the frame, of a non-metallic compression and tension spring snubber device also positioned between the frame and bolster, said device comprising a tubular body, offset anchoring portions at opposite ends of said body presenting inwardly facing abutments, housings for receiving the said offset anchoring portions, and annular locking rings seated in the housings and engaging said abutments to clamp the offset portions of said body in the housings.

NORMAN E. GEE.